United States Patent [19]
Johnston et al.

[11] Patent Number: 4,747,894
[45] Date of Patent: May 31, 1988

[54] STARCH ADHESIVE BONDING

[75] Inventors: Herbert N. Johnston; Donald F. Hiscock; Ralph E. Beard, all of Columbus, Ohio

[73] Assignee: Battelle Memorial Institute, Columbus, Ohio

[21] Appl. No.: 736,623

[22] Filed: May 21, 1985

[51] Int. Cl.$^4$ .......................... B29C 65/08; B31F 1/28; C09J 3/06
[52] U.S. Cl. .................................. 156/73.1; 156/205; 156/292; 156/322; 156/336; 156/472; 156/499; 156/580.2; 493/463
[58] Field of Search ..................... 156/73.1, 73.4, 336, 156/205, 471, 470, 472, 580.1, 580.2, 292, 322, 499; 264/23; 493/463, 129; 228/1.1

[56] References Cited

U.S. PATENT DOCUMENTS

| | | | |
|---|---|---|---|
| 3,434,901 | 3/1969 | Griffiths et al. | 156/336 |
| 3,480,492 | 11/1969 | Hauser | 156/73.1 |
| 3,652,354 | 3/1972 | Su | 156/73.4 |
| 3,864,185 | 2/1974 | Johnson et al. | 156/336 |
| 4,116,740 | 9/1978 | Musselman et al. | 156/336 |
| 4,333,779 | 6/1982 | Rinker et al. | 156/73.1 |
| 4,356,051 | 10/1982 | Moodie et al. | 156/472 |
| 4,359,341 | 11/1982 | Allen | 156/336 |

OTHER PUBLICATIONS

Diddminicis, A. J. et al., "Corrugating" In: *Pulp and Paper Chemistry and Chemical Technology*, vol. IV, Third Edition, (1983), pp. 2373–2398.

*Primary Examiner*—Michael Wityshyn
*Attorney, Agent, or Firm*—Klaus H. Wiesmann; Kenneth R. Warburton

[57] ABSTRACT

A method and apparatus for starch adhesive bonding of paper, paperboard, and natural cellulosic-fiber materials, especially liner and fluted corrugating medium, into manufactured items, particularly corrugated board. The method includes applying an adhesive coating, comprising starch and water, to a first substrate (e.g. tips of flutes of a corrugated medium), contacting the applied coating with another substrate (e.g. liner) and while so positioned contacting an exterior surface of at least one of the substrates with an ultrasonic energy generating means so as to transmit ultrasonic energy to the adhesive coating to increase coating adhesion to the substrates. The apparatus includes ultrasound means (10, or 37,37', or 43,43', or 55,55', or 61,61') forming a nip with an anvil 16, or roll 35 or 44, or drive means 57 or 62, with the nip including therebetween paper 17/ starch adhesive 19/ paper 18, or liner 30 or 50/ starch adhesive 32/corrugated medium 31 or 51, or liner 40 or 60/ starch adhesive 32'/ single faced corrugated board 34' or 52'.

9 Claims, 4 Drawing Sheets

STARCH ADHESIVE BONDING

FIELD

This invention relates to method and apparatus for adhesive bonding of paper, paperboard, and like natural cellulosic-fiber materials. More particularly, it has to do with ultrasonic energy used for a starch adhesive bonding of these materials together. Most particularly, the invention concerns using ultrasonic energy with such materials as liner and fluted corrugating medium being adhesively starch bonded to provide corrugated board.

BACKGROUND

Ultrasonic energy has been taught as useful for fiber liberation, disintegration, and the like and for other purposes in the making of paper, paperboard, and like natural cellulosic-fiber materials. However, conventionally when fabricating such materials into various items of manufacture, such as corrugated board, laminated paper products, convoluted cardboard tubing, paper bags, and numerous other useful items, the fabrication methods and techniques depend on adhesive bonding of the materials. With the just-mentioned materials and a starch adhesive bonding thereof, it is believed to be unknown to employ ultrasonic energy as taught herein.

Some studies have been made of the effect of ultrasonic energy on starch and starch paste. Illustrative thereof are teachings of: "Sonification Effect on Potato Starch and Sweet Potato Powder", A. Azhar and K. Hamdy, *Journal of Food Science*, Vol. 44 (1979) p. 801-804; "The Effects of Ultrasound on Starch Grains", M. DeGrois, D. Gallant, P. Baldo, and Guilbot, *Ultrasonics*, May 1974, p. 129-131; and "Starch and Its Derivatives", J. A. Radley, Vol. One, 3rd Edition, (1953), paragraph bridging p. 112-113. In general, those teachings report the effect of ultrasound on starch to be starch degradation and deterioration.

Illustrative of the present-day status of the making of corrugated board is a descriptive review in Chapter 26 "Corrugating" by A. J. Didominicis and G. H. Klein in the text of "Pulp and Paper Chemistry and Chemical Technology", Vol. IV, Third Edition, (1983), James P. Casey - Editor, John Wiley & Sons.

As taught in the just-mentioned text, in corrugated board production, starch adhesive is used to bond the liner(s) to the fluted medium. In a typical adhesive formulation, a major portion of the starch is uncooked to maintain reasonable viscosity levels prior to application to the tips of the flutes. Heat is applied to the starch mixture to achieve gelatinization of the starch so that it acts as an adhesive. Typically, the heat is applied to the starch during passage between pressure rolls by thermal conduction through the preheated fluted medium contacting a heated roll and/or by thermal conduction through the preheated liner contacting a heated roll. Problems with this process include the following: (1) poor quality, low strength, bonds frequently result from non-uniform heating of the adhesive; (2) non-uniform heating of the liner or fluted medium often distorts the resultant corrugated board; and (3) inefficient use of thermal energy in heating those portions of the liner and fluted medium that do not require bonding.

The invention described herein minimizes these problems and achieves better bonding at higher production rates while reducing energy consumption.

DISCLOSURE SUMMARY

The present invention generally stated is a method of adhering substrates of paper, paperboard, and like cellulosic-fiber materials to each other by means of adhesive composition there-between, which method comprises the steps of (a) applying a coating of an adhesive composition, which comprises starch and water, to a surface area of a first substrate; (b) positioning an uncoated surface area of another substrate in contact with the applied coating; (c) contacting an output horn of an ultrasonic energy generating means with one or the other or both of the first or another positioned substrate at an exterior surface area thereof juxtapositional to the applied coating between the positioned substrates; (d) generating ultrasonic energy with the ultrasonic energy generating means so as to transmit from the output horn into the coating the ultrasonic energy of a frequency and for a time duration so as to increase adhesiveness of the coating to the positioned substrates.

Generally and as illustrated herein, the substrates to be adhered are in the form of sheet or web-like lengths, such as relatively continuously-formed lengths of paper, paperboard and the like natural cellulosic-fiber materials. For purposes of illustrating the invention with specificity, the invention is described by employing liner, corrugating medium, etc. and the making of corrugated board. With reference to the description which follows and contents of the aforementioned text chapter entitled "Corrugating", it is believed apparent how to retrofit conventional practices and apparatus for making of corrugating board using the ultrasonic application procedures and components taught herein by adding, supplementing, deleting and/or replacing conventional rollers, belts, etc. along with incorporating requisite ultrasonic energy means.

The present invention also includes apparatus useful for its practice. An appropriate useful apparatus, for adhering substrates of paper, paperboard, and like cellulosic-fiber materials to each other by means of an adhesive composition therebetween, comprises the following components: (a) means for applying a coating of an adhesive composition, which comprises starch and water, to a surface area of a first substrate; (b) means for positioning an uncoated surface area of another substrate in contact with the applied coating; and (c) means for applying ultrasonic energy to one or the other or both of the first or another positioned substrates at an exterior surface area thereof juxtapositional to the applied coating between the positioned substrates.

The foregoing apparatus also may comprise (d) one or more means for preheating either or both of the first and the other substrates to a temperature less than the gelatinization temperature of the adhesive composition prior to applying of the coating to the first substrate and prior to contact of another substrate with the applied coating. Additionally the apparatus generally includes: (e) one or more roll means provided with flutes thereon for forming of a fluted corrugating medium to function as the first substrate, and with the (c) means for applying ultrasonic energy positioned in relation to other components so as to provide, between an output horn of the means for applying ultrasonic energy and a flute on a roll means, a nip space less than the combined thickness of the first substrate, the coating and the other substrate.

DRAWINGS

Figure 1:
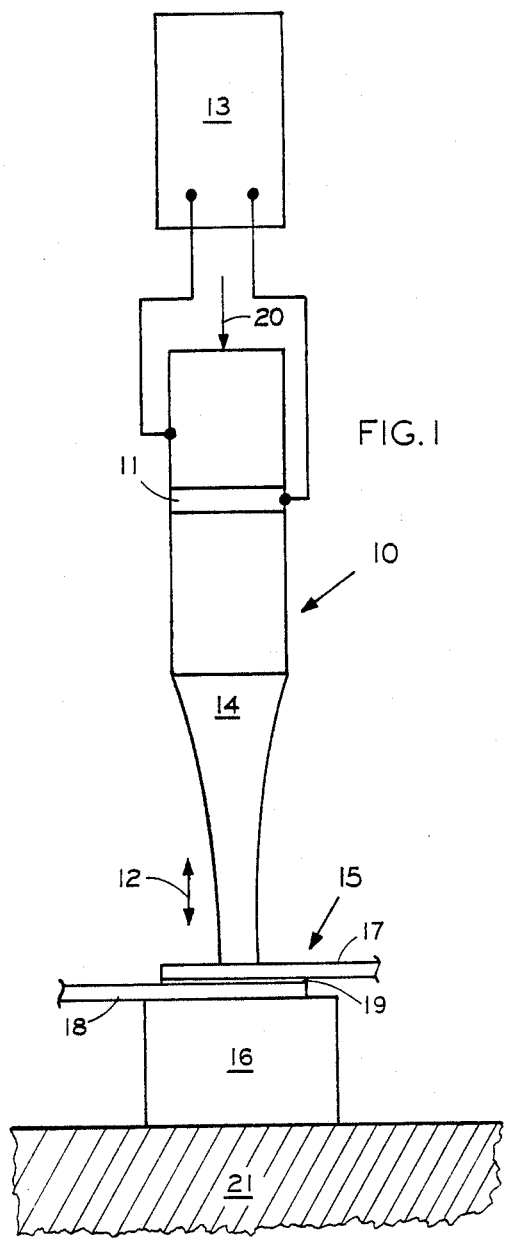
FIG. 1 is a schematic view of experimental apparatus for demonstrating feasibility of ultrasonic bonding according to this invention.

In the drawings the same number used at other than its initial presentation designates the same, similar, or like equivalent component or element. Also the same number with a prime mark designates another or additional component, which is the same and/or similar and corresponds to the same component designated by the same number without the prime mark.

DETAILED DISCLOSURE AND CARRYING OUT THE INVENTION

Referring to FIG. 1, experimental apparatus 10 for demonstrating the feasibility of ultrasonic bonding according to this invention is shown schematically. The test specimen 15 was a lap joint formed by overlapping porous paper 17,18 with an intervening layer of adhesive 19. An ultrasonic transducer 11 produced high frequency (e.g. 20 kHz) vibratory motion 12 of 0.025 mm amplitude when energized by an electrical generator 13. The vibratory motion 12 was transferred via the horn 14 to the test specimen 15 compressed between an anvil 16 and the horn 14. A controlled force for compression was provided in an axial direction 20 by movement of the transducer 11 and horn 14 toward the metal anvil 16 resting on the stationary surface 21. The ultrasonic transducer was energized prior to contact of the horn 14 with the test specimen and deenergized a fraction of second after a steady-state peak pressure was attained to produce an adhesive bond. Control experiments were conducted in a similar manner except that the transducer 11 was not energized and no ultrasound was applied.

A tensile testing machine (Instron Company) was used to determine the strength of the adhesive bond at the lap joint of the test specimen 15. The bond strength of the lap joint was calculated as the force in newtons (N) applied to the ends of the porous paper 17,18, held in the jaws of the tensile testing machine divided by the area in square meters ($m^2$) of the lap joint parallel to the paper 17,18. The bond strength of the lap joint measured in the above manner often exceeded the force that could be applied in a direction parallel to the paper 17, 18, and the paper 17 or 18 broke at other than the lap-joint bond area.

An experimental procedure was developed which simulated conventional adhesive bonding as determined by the bond strength of specimens in control experiments in which no ultrasound was used. The procedure for control experiments will be described first. The anvil 16 which could be heated to any temperature up to 200 C. was maintained at the desired test temperature (typically room ambient temperature of 26 C., 93 C., or 149 C.). The lap-joint test specimen 15 was placed on the anvil 16 as shown in FIG. 1 and simultaneously the hydraulic feed mechanism of the experiment apparatus 10 was activated. From the initial starting position, the horn typically contacted the test specimen in 2 seconds and compressed the test specimen 15 over a typical period of 2.5 seconds to a peak pressure of 1,400,000 $N/m^2$ (200 $lb/in^2$) which was then maintained for 1 second after which the hydraulic feed mechanism was deactivated and compression reduced over a typical period of 4 seconds after which the test specimen 15 was removed from the anvil 16. The adhesively-bonded test specimens 15 were set aside for subsequent determination of bond strength.

The above procedure used in control experiments was followed by comparative experiments using ultrasound in which the transducer 11 was energized simultaneously with activation of the hydraulic feed mechanism at the beginning of the experiment. In comparable experiments, the time from the beginning of the experiment until the peak pressure level was reached was reproducible. In experiments with ultrasound applied, the transducer was deenergized after various time periods at the steady-state pressure of 1,400,000 $N/m^2$ such as 0.300, 0.150, and 0.075 seconds with compression maintained the full 1 second as in the control experiments.

In experiments in which the materials of the test specimen 15 were a liner and medium typically used in making corrugated board, the bond produced by use of ultrasound greatly exceeded the breaking strength of the medium. Corrugating medium is made from low strength materials (e.g. straw, waste paper, or semi-chemical pulp). Standard liner is made from high strength materials (e.g. heavy weight kraft or jute paper) and has much higher tensile strength than corrugated medium. Thus, to obtain comparative quantitative data on adhesive bond strength, experimental test specimens 15 were made from two samples of liner typically used in making corrugated board. A test specimen in which liner 17 was bonded to another liner 18 allowed quantitative measurement of the adhesive bond strength up to the breaking strength of the liners 17 or 18.

Samples of typical paper liner 17,18, approximately 75 mm×50 mm×0.46 mm, were overlapped about 6 mm. One sample of liner 18 was precoated on its surface being overlapped with a starch adhesive 19 to a thickness of 0.25 mm using a Baker blade. The horn 14 had dimensions of 150 mm×19 mm which exceeded the lap-joint area (50 mm×6 mm). The hydraulic force in the vertical direction 20 over the area of the lap joint of the test specimen 15 produced a compression of liners 17,18, of 1,400,000 $N/m^2$ which is a typical pressure in the nip of conventional pressure rolls used to bond single facer liner to corrugated medium. The compression was the minimum attainable with the experimental set up. Lower compression in the range of 3000 to 100,000 $N/m^2$, depending on web thickness, would be adequate to insure good contact of liner 17 with liner 18 and adhesive 19.

The starch adhesive 19 was a sample of a conventional corrugating starch adhesive formulation prepared as follows:

Primary mixer (carrier starch)

| | -continued | |
|---|---|---|
| Step 1 | Add water | 378.5 liter |
| Step 2 | Add corn starch | 90.9 kg |
| Step 3 | Add caustic soda dissolved in about 37.9 liters of water | 13.6 kg |
| Step 4 | Heat to | 66 to 71° C. |
| Step 5 | Hold under agitation | 15 min |
| Step 6 | Add cooling water | 227.1 liters |
| | Secondary mixer (raw starch) | |
| Step 7 | Add water | 1514 liters |
| Step 8 | Heat to | 27 to 32° C. |
| Step 9 | Add corn starch | 454.5 kg |
| Step 10 | Add borax (10 mole) | 13.6 kg |
| Step 11 | Transfer primary to secondary in about 30 min | |

Additional details and description for preparation of the above starch adhesive formulation can be found on pages 2388–2392 in the aforementioned Chapter 26 "Corrugating" of the text "Pulp and Paper Chemistry and Chemical Technology". The above starch adhesive 19 was at room temperature (26 C.) when applied to the liner 18. In the control experiments in which the anvil 16 was heated, heat transfer from the anvil 16 to the starch 19 occurred through the liner 18 after the lap joint 15 was positioned on the anvil 16.

The above experimental conditions provided a simulation of conventional adhesive bonding of corrugated board for control experiments in which no ultrasound was applied based on the experimental results discussed next.

Figure 2:
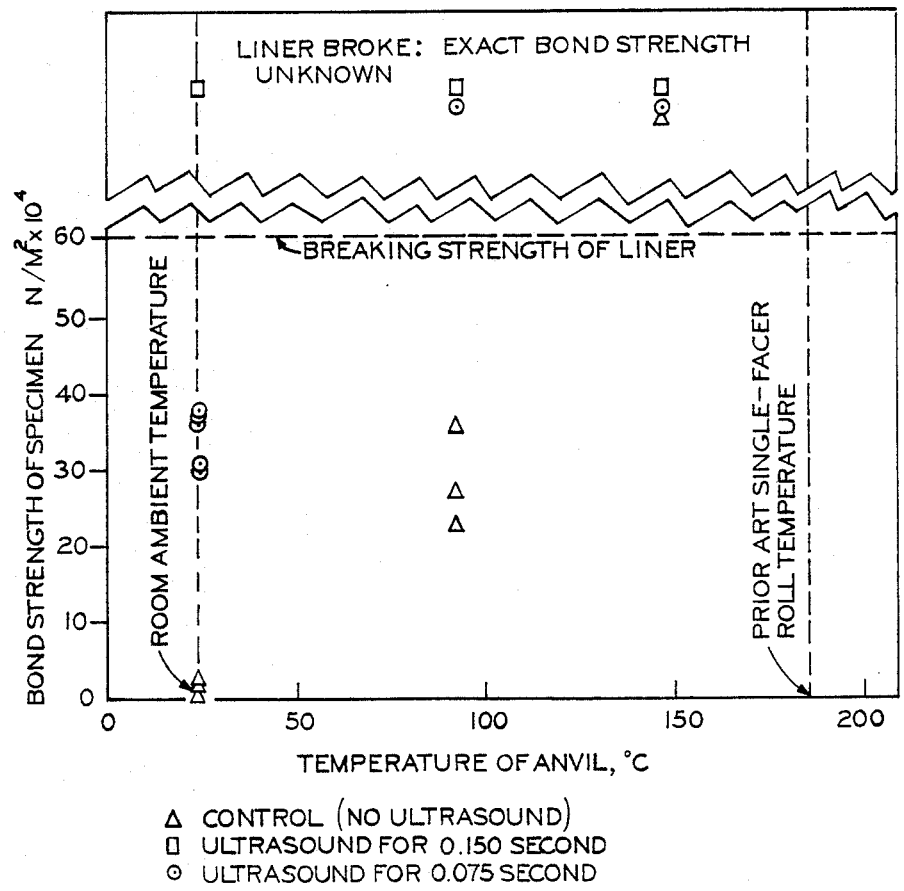
FIG. 2 is a graph of bond strength versus temperature with and without application of ultrasound to lap-joint liner specimens.

The results of comparative experiments conducted to demonstrate the beneficial effect of use of ultrasonics in bonding liner materials with starch adhesive are summarized in FIG. 2. In control experiments, in which no ultrasonic energy was used, essentially no bonding was obtained at room temperature (~26 C.) with peak pressure maintained for 1 second in all experiments. As shown in FIG. 2, bond strength in the range of 220,000 and 350,000 N/m² was obtained for lap-joint specimens with the anvil 16 at a temperature of 93 C. At an anvil temperature of 149 C., the bond strength was above the breaking strength of the paper liners 17,18 and quantitatively indeterminate. The latter result is typical of conventional bonding on paper machines in which the single-facer pressure roll is typically maintained at 188 C. and the resultant bonds with starch adhesive are stronger than the liner.

In similar experiments in which ultrasonic energy at 20 kHz was applied for a time of 0.150 seconds of the total time of 1 second at peak pressure, good bonds were obtained above the breaking strength of the liner 17,18 at all temperatures tested of 26 C., 93 C., and 149 C. as shown in FIG. 2. The results with the anvil 16 at room ambient temperature (26 C.) clearly show the beneficial effect of ultrasonic bonding (i.e. good bond with ultrasonics and no significant bond in the absence of ultrasonic energy input). Thus, the use of ultrasonics can produce a good bond at room temperature without the need for inefficient heating of the corrugated board materials by heat transfer rolls at temperatures above 150 C. as presently required in conventional starch bonding processes of the prior art that do not use ultrasonic energy.

Additional experiments were conducted with the time of application of ultrasound energy at peak pressure reduced from 0.150 second to 0.075 second. As shown in FIG. 2, experiments with ultrasound for 0.075 second produced good bonds at 93 C. which were at least twice as strong as comparable bonds in the absence of ultrasound. At room ambient temperature, the shorter period of application of ultrasound still produced a significant bond strength, as good as achievable with samples in control experiments at 93 C. which did not use ultrasound.

Other experiments conducted with a time of application of ultrasound energy of 0.300 second at peak pressure produced results similar to those for 0.150 seconds as shown in FIG. 2.

The exact mechanism by which application of ultrasound improves the bonds achieved with starch adhesive is not known. It is expected that ultrasound applied to the lap joint of test specimen 15 produced heat sufficient to raise the temperature of the starch adhesive above the gelatinization temperature of approximatel 60 C. of the employed starch adhesive 19. However, other factors than heat may be involved. It is well known that ultrasound promotes fluid flow into porous materials and can increase wetability. Ultrasound might promote adsorption of heat and water into the raw starch granules to cause gelatinization to occur at lower temperature than in the absence of ultrasound. There may be other factors involved which lead to improved bonds by use of ultrasonic energy at much lower anvil temperature than expected based on the prior art. The results with the anvil at room ambient temperature as shown in FIG. 2 clearly demonstrates the beneficial effect of application of ultrasound. The negligible bond obtained in the control experiments with the anvil at 26 C. would be expected since the starch adhesive would not reach the gelatinization temperature of about 60 C. In contrast, use of ultrasound for 0.075 second to 0.300 seconds at peak pressure achieved bonds comparable to bonds requiring anvil temperatures of 93 C. to 149 C. in the absence of ultrasound.

The ultrasonic apparatus 10 used in the experiments had an input rating of about 1 kW. However, the exact amount of ultrasonic energy coupled to the lap joint of the test specimen 15 is not known. In the experiments, ultrasound was coupled to the materials of the lap joint of the test specimen 15 when the horn 14 made contact with the liner 17 and the pressure began to increase. The ultrasound coupling was probably very inefficient at first and increased with compression reaching maximum efficiency of coupling at some unknown compression level below peak pressure. It is believed that a significant portion of the ultrasound energy input to the lap joint of the test specimen 15 occurred during the time period at steady-state peak pressure since reduction of the latter time period from 0.150 second to 0.075 second affected the bond strength in experiments at room temperature (26 C.) as shown in FIG. 2.

No direct measurement of temperature of the starch adhesive 19 could be conveniently made during application of ultrasound. However, test specimens that had been subjected to ultrasound at 20 kHz for 0.300 second at peak pressure with the anvil 16 at room temperature (26 C.) were prepared for examination by scanning electron microscope. There was no evidence of raw starch granules from the original applied coating left in the area of the lap joint bond which suggests that the gelatinization temperature of about 60 C. had been exceeded in the starch adhesive 19 by application of ultrasound. The ultrasound might have coupled directly to the starch adhesive producing heat in-situ. It is also probable that the ultrasound coupled efficiently to the liner 17 in contact with the horn 14 and also coupled to the liner 18 to produce heat in situ within the liners 17,18 which would be conducted to the starch adhesive 19 to increase its temperature. In-situ generation of heat within the lap joint of test specimen 15 would be more efficient in raising the starch temperature to the gelatinization temperature in a finite time than by thermal conduction from the anvil 16 through the liner 18 required in the control experiments. Regardless of the exact mechanism by which use of ultrasound achieves good bonds at low anvil temperature, ultrasound has beneficial effects that can be practically applied to bonding with starch adhesive of porous paper products such as corrugated board.

Figure 3:
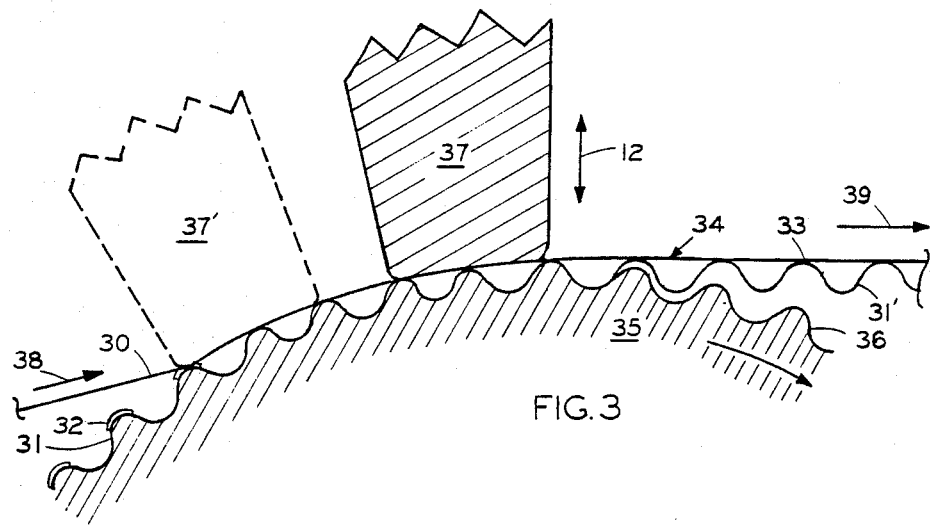
FIG. 3 is a side schematic cross-section of apparatus for ultrasonic bonding of liner to fluted medium to make single faced corrugated board.
Figure 4:
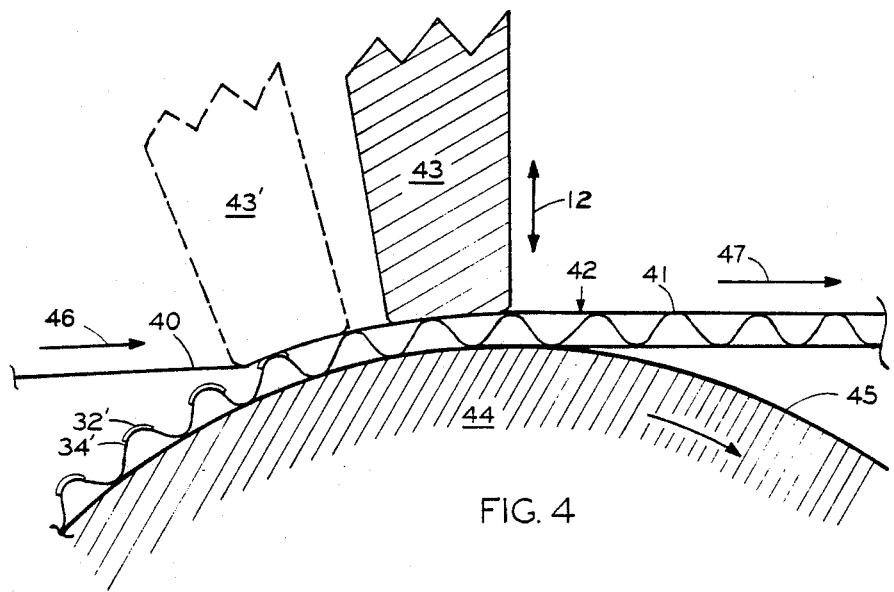
FIG. 4 is a side schematic cross-section of apparatus for ultrasonic bonding of liner to single-faced corrugated board to make double-backed corrugated board.

In typical embodiments of this invention, as shown schematically in FIGS. 3 and 4, ultrasonic apparatus can be added to conventional production machines for starch bonding of corrugated board. FIG. 3 shows a typical embodiment of this invention for production of corrugated board of the type referred to as single-faced 34. A typical rotating metal roll 35 with a surface containing metal flutes 36 carries a fluted medium 31 that has been prepasted with starch adhesive 32 at the tips of the flutes. An ultrasound horn 37 or a plurality of similar horns 37' is oriented in an essentially radial position relative to the roll 35 (i.e. horn 37 is juxtapositionally positioned with respect to adhesive 32 at the tips) and fixedly positioned such that a pressure nip is formed between the horn 37 of the ultrasound apparatus and the flutes 36 of the roll 35. Liner 30 moving in direction 38 passes into the nip of the first horn 37' contacting the adhesive 32 and is compressed against the fluted medium 31 when rotation of the roll 35 brings a metal flute 36 and the fixedly positioned horn 37' to their minimum spacing. The spacing between the horn 37,37' and metal flute 36 on the roll 35 is adjusted to slightly less than the combined thickness of the liner 30, adhesive 32 and fluted medium 31 to produce the desired compression in the nip. Ultrasonic energy is applied via the horn 37,37' to one side of the liner 30 to provide high frequency vibration 12 in an axial direction to produce a bond 33 in the single-faced corrugated board 34 that subsequently detaches from the roll 35 and continues in the direction 39. The horn 37,37' or multiple segments (not illustrated) of horns extend the width of the roll 35 (direction perpendicular to plane of FIG. 3).

FIG. 4 shows a typical embodiment of the invention for producing corrugated board of the type referred to as double-backed 42. The apparatus and process of FIG. 4 differ from FIG. 3 in that the roll 44 has a smooth surface 45 and carries a single-faced board 34' coated with adhesive 32' at the flute tips into contact with the double-backer liner 40 moving in direction 46. The process differs in that the spacing between the fixedly positioned horns 43,43' and the surface 45 of the roll 44 is adjusted to slightly less than the caliper of the resultant double-faced board 42 so as to produce compression of the liner 40 and single-faced board 34' in the nip between the horn 43,43' and single faced board 34' without exceeding the compressive strength of the single-faced board 34'.

In the practice of this invention, magnetostrictive and piezoelectric transducers are typically used to generate ultrasound at frequencies from about 2 to 100 kHz. It is preferred to operate at frequencies in the range of 10 to 100 kHz or above the frequency limit for human hearing. The ultrasonic horn is designed in accordance with well-known principles for efficient coupling and in relation to the bonding application. For example in FIG. 3, the surface of the horn 37 in contact with liner 38 would have a slight radius corresponding essentially to the radius of the roll 35 at the tips of the flutes 36 plus an allowance for the compressed thickness of the liner 30 and medium 31. Similarly, in FIG. 4 the surface of the horn 43 would have a radius essentially equal to the radius of the roll 44 plus an allowance for the caliper of the compressed double-backed corrugated board. The length of the horn 37 in the direction of rotation of roll 35 is selected such that one or more flutes may be subjected to ultrasound under a single horn 37. For example, typical corrugated board of 128 flutes/meter would have a spacing of 0.78 cm between tips of adjacent flutes and the length of the horn in contact with liner 30 could be in the range of 0.1 cm to 2 cm. A horn 37 with length of 2 cm might have a width of about 30 cm across the width of roll 35 and sufficient similar horns 35 would be used across the width of the roll 35 to accommodate the width of the single-faced board 34 being produced. Typically, ultrasonic vibration in the radial direction 12 would be applied continuously and the duration of application for each flute bond 33 would be related to the length of the horn 37 and the speed of the web 34. For example, with web speed of 3 m/sec and length of horn of 2 cm, the duration of application of ultrasound to a single flute bond 33 would be about 0.007 second. Additional horns 43' would be used to increase the duration of ultrasound application (e.g. 0.07 second for ten horns) as needed depending on such factors as the energy provided by each horn, the efficiency of energy coupling, and the temperature of the liner 30, medium 31, and starch 32 prior to entering the nip (i.e. amount of preheating).

Apparatus according to this invention for adhering substrates of paper, paperboard, and like cellulosic-fiber materials to each other by means of an adhesive composition therebetween comprises means for applying ultrasonic energy and other means as appropriate to manufacture the finished product. For purposes of illustrating the invention, the invention is described for making single-faced corrugated board as shown schematically in FIG. 5 and double-backed corrugated board as shown in FIG. 6.

Figure 5:
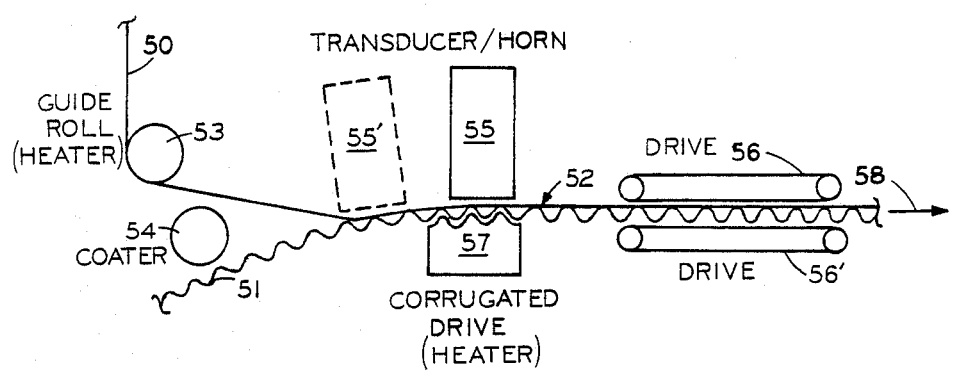
FIG. 5 is a schematic apparatus for producing single-faced corrugated board.

Referring to FIG. 5, apparatus according to this invention for production of single-faced corrugated board 52 comprises substitution of ultrasonic apparatus 55,55' for the conventional pressure bonding roll used in the prior art. A moving web of preformed fluted medium 51 is coated with an adhesive composition, which comprises starch and water, by a conventional starch applicator roll coater 54 which applies a thin layer of starch to the surface area at the tip of the flutes. A guide roll 53 guides the moving web of single-facer liner 50 into juxtapositional contact with the starch coated flute tips of medium 51 in the nip formed between the ultrasonic transducer/horn 55,55' and the corrugated drive 57. Ultrasound is applied to adhesively bond the webs 50,51 while they pass through the nip in the manner as previously described with reference to corresponding liner 30 and fluted medium 31 of FIG. 3. A drive means 56 such as a canvas belt moves the web of adhesively-bonded single-faced board 52 in the direction 58 to subsequent operations such as trimming, slitting and cutting if it is the final product or to the subsequent production of double-backed corrugated board. The ultrasonic apparatus comprises electrical generating means connected to the transducer/horn 55 or a plurality of similar transducer/horns 55' as required to impart the necessary ultrasound energy for adhesive bonding depending on the web speed and other factors such as the temperature of the liner 50, fluted medium 51 and starch coating prior to application of ultrasonic energy. For example, the guide roll 53 might be a drum-type heater to preheat the liner 50. The corrugated drive 57 might also be heated to preheat the medium 51. Typically, the corrugated drive/heater is the conventional dual purpose corrugating roll on which the medium is formed into flutes prior to coating the flute tips of the fluted medium 51 with starch at the coater 54.

Figure 6:
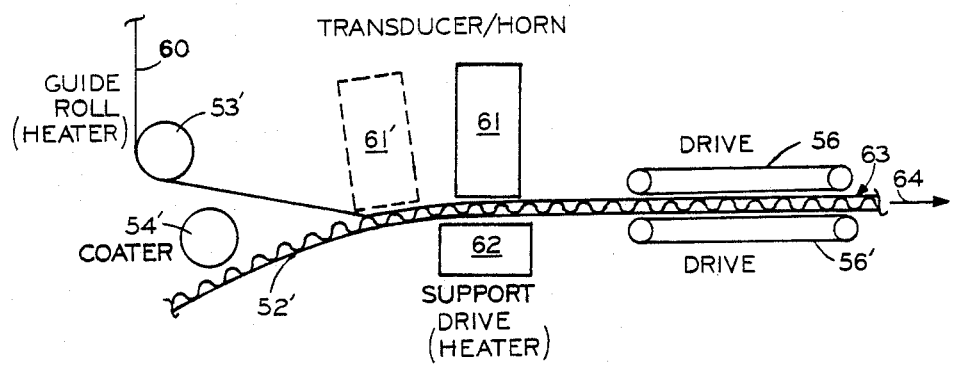
FIG. 6 is a schematic of apparatus for producing double-backed corrugated board (i.e. single wall corrugated board).

Referring to FIG. 6, apparatus according to this invention for production of double-backed corrugated board 63 comprises substitution of ultrasonic apparatus 61,61' for the conventional heated platens or pressure bonding rolls used in the prior art. A moving web of single-faced corrugated board 52', which is typically a continuation of web 52 of FIG. 5 moving in the direction 58, is coated at the flute tips with starch adhesive at a coater 54'. A guide roll 53' guides the moving web of double-backer liner 60 into contact with the starch-coated flute tips of single-faced board 52' in the nip formed between the ultrasonic transducer/horn 61,61' and the support drive 62. Ultrasound is applied to adhesively bond the webs 60 and 52' while they pass through the nip as previously described with reference to FIG. 4. Drive means 56,56', such as canvas belts, move the adhesively-bonded, double-backed corrugated board in the direction 64 to subsequent operations such as slitting, trimming, and cutting. A hot-plate section may precede or be combined with the drive 56,56' wherein heat is transferred to the surfaces of the combined corrugated web 63 by steam heated platens or rolls to further set and develop the ultimate adhesive bond strength. The ultrasonic apparatus comprises electric generating means connected to the transducer/horn 61 or a plurality of transducer/horns 61' as required to accomplish adhesive bonding depending on web speed and other factors such as preheat of the double-backer liner 60 by a drum-type heater 53' or preheat of the single-facer board 52' by a rotating drum-type heater 62 with an essentially smooth (non-corrugated) surface supporting and driving the web 52'.

While the invention has been described with particularity and specificity as to its employment in manufacture of corrugated board and specifically illustrated with respect to single-faced corrugated board and double-backed corrugated board, it is contemplated from teachings herein also to be useful for manufacture of other corrugated board constructions, for example double-wall and triple-wall corrugated board and from teachings presented herein for one in the art to so apply the invention. Likewise the invention is contemplated to be readily applicable to manufacture of other items, whose constructions involve adhesively starch bonding together of paper, paperboard, and like natural cellulosic-fiber materials. To mention just a few of such items and applications, they include: laminated paper products, paper bags, rolled tubing, and convoluted tubing, rapid sealing of moistened starch-gummed tapes and labels, etc.

Of essence to the invention is that the applied ultrasonic energy increases the adhesiveness of a starch adhesive coating, which contacts the to-be-adhered substrates of paper, paperboard, or like cellulosic-fiber material. The composition of the starch adhesive coating can vary greatly with the invention still being applicable. The starch adhesive, as applied, comprises starch and water, but also may contain numerous other constituents, and also vary considerable in its formulation. For example, instead of the herein described adhesive comprising both cooked starch and natural or raw granules of starch, the starch adhesive could be of a no-carrier starch adhesive formulation, wherein the starch granules are swelled in a controlled manner to a desired viscosity. Water-resistant starch adhesive formulations containing synthetic resins and the like also should be useful in practicing the invention. Additionally various starch formulations containing physically and/or chemically modified starches should be useful in practicing the invention.

While the significant advantages and improvements of the invention resulting from its application to corrugated board manufacture as illustrated herein may not be of the same magnitude and be greater or less with differing starch adhesive compositions in applying the invention to manufacturing items other than corrugated board, it still is considered that the invention will be useful with such compositions and in such manufacturing while remaining within the true spirit of the invention.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and the various changes may be made without departing from the spirit or scope of the invention.

I claim:

1. A method of adhering substrates of paper, paperboard, and like cellulosic-fiber materials to each other by means of adhesive composition therebetween, which method comprises the steps of
    (a) applying a coating of an adhesive composition, which comprises starch and water, to a surface area of a first substrate, which substrate is a fluted or corrugated medium in the form of sheet or web like lengths; whereby the coating of the adhesive composition is applied to tips of flutes of the fluted or corrugated medium;
    (b) positioning an uncoated surface area of another substrate in contact with the applied coating, which substrate is a liner in the form of sheet or web like lengths;
    (c) contacting an output horn of an ultrasonic energy generating means with one or the other or both of the first or another positioned substrates at a moving exterior surface area thereof juxtapositional to the applied coating between the positioned substrates;
    (d) carrying adhesive-uncoated reverse surfaces of the flutes of the fluted corrugating medium on metal flutes located on a rotating metal roll so as the roll functions as an anvil for the output horn and in conjunction with the output horn provides a nip spacing between the roll and the output horn of less than the combined thickness of the fluted corrugating medium, the adhesive coating, and the liner; and
    (e) generating ultrasonic energy with the ultrasonic energy generating means so as to transmit from the output horn into the coating the ultrasonic energy of a frequency and for a time duration so as to increase adhesiveness of the coating to the positioned substrates;

whereby the product of the method is corrugated board.

2. The method of claim 1 in which the (e) generating of the ultrasonic energy at the output horn is of a frequency between 10 and 100 kHz and for a time duration of less than one second.

3. The process of claim 1 in which a plurality of ultrasonic generating means are employed, each means juxtapositioned to the coating of the adhesive composition on the tips of the flutes of the fluted corrugating medium when the (e) generating of ultrasonic energy is produced and with the generating of the ultrasonic energy at each output horn of each of the plurality of ultrasonic energy generating means of a frequency between 10 and 100 kHz for a time duration of less than one second.

4. The process of claim 1 in which, at the time of energy into the nip, each of the moving fluted corrugating medium and the moving liner are of a temperature below a temperature which causes gelatinization of the adhesive composition.

5. The method of each of claims 1, 2, 3 and 4 in which the applying is of the adhesive composition which comprises cooked starch in water and raw starch granules.

6. An apparatus for adhering substrates of paper, paperboard, and like cellulosic-fiber materials to each other by means of an adhesive composition therebetween, which apparatus comprises the following components:
   (a) means for applying a coating of an adhesive composition, which comprises starch and water, to a surface area of a first substrate;
   (b) means for positioning an uncoated surface area of another substrate in juxtapositional contact with the applied coating;
   (c) means for applying ultrasonic energy to one or the other or both of the first or the another positioned substrates at an exterior surface area thereof juxtapositional to the applied coating between the positioned substrates;
   (d) one or more means for preheating either or both of the first and the other substrates to a temperature less than the gelatinization temperature of the adhesive composition prior to applying of the coating to the first substrate and prior to contact of the another substrate with the applied coating; and
   (e) one or more roll means provided with flutes thereon for forming of a fluted corrugating medium to function as the first substrate, and with the (c) means for applying ultrasonic energy positioned in relation to other components so as to provide, between an output horn of the means for applying ultrasonic energy and a flute on a roll means, a nip space less than the combined thickness of the first substrate, the coating and the other substrate.

7. The apparatus of claim 6 which includes: the (a) means for applying the coating adapted so as to apply the coating of the adhesive on the tips of flutes of the fluted corrugating medium; and the additional component of
   (f) means for moving between the nip space of the combination of the first substrate which is a fluted corrugating medium and has the applied coating on the tips of its flutes and, while in juxtapositional contacting relationship thereto, the other substrate which is liner.

8. An apparatus for adhering substrates of paper, paperboard, and like cellulosic-fiber materials to each other by means of an adhesive composition therebetween, which apparatus comprises the following components:
   (a) means for applying a coating of an adhesive composition, which comprises starch and water, to a surface area of a first substrate;
   (b) means for positioning an uncoated surface area of another substrate in juxtapositional contact with the applied coating;
   (c) means for applying ultrasonic energy to one or the other or both of the first or the another positioned substrates at an exterior surface area thereof juxtapositional to the applied coating between the positioned substrates; and
   (d) one or more roll means provided with flutes thereon for forming of a fluted corrugating medium to function as the first substrate, and with the (c) means for applying ultrasonic energy positioned in relation to other components so as to provide, between an output horn of the means for applying ultrasonic energy and a flute on a roll means, a nip space less than the combined thickness of the first substrate, the coating and the other substrate.

9. The apparatus of claim 8 which includes: the (a) means for applying the coating adapted so as to apply the coating of the adhesive or the tips of flutes of the fluted corrugating medium; and the additional component of
   (f) means for moving between the nip space of the combination of the first substrate which is a fluted corrugating medium and has the applied coating on the tips of its flutes and, while in juxtapositional contacting relationship thereto, the other substrate which is liner.

* * * * *